C. J. SCHWARZE.
RAILWAY SIGNALING SYSTEM.
APPLICATION FILED JULY 18, 1906.
902,176.
Patented Oct. 27, 1908.
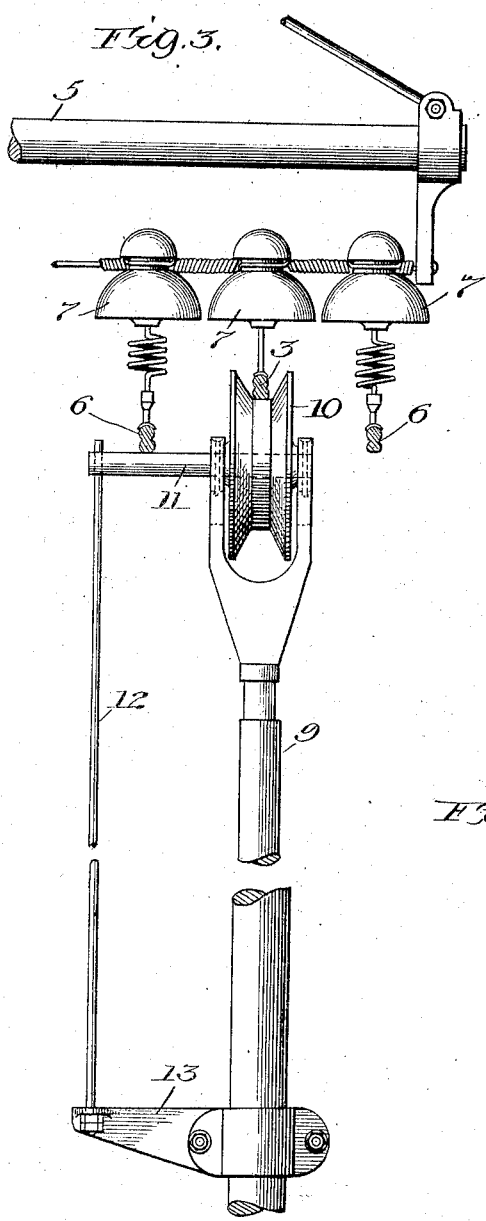
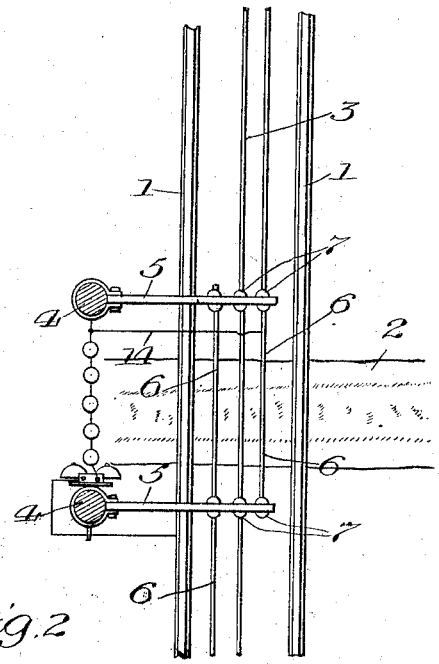
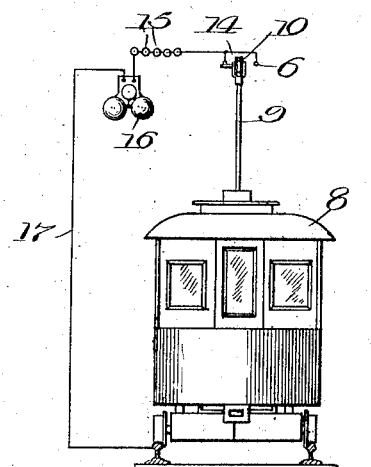
Witnesses:
Inventor,
Carl J. Schwarze though the lamps are preferably so arranged as to show only when the signal circuit is closed.

UNITED STATES PATENT OFFICE.

CARL J. SCHWARZE, OF ADRIAN, MICHIGAN.

RAILWAY SIGNALING SYSTEM.

No. 902,176.     Specification of Letters Patent.     Patented Oct. 27, 1908.

Application filed July 18, 1906. Serial No. 326,780.

*To all whom it may concern:*

Be it known that I, CARL J. SCHWARZE, a citizen of the United States, residing at Adrian, in the county of Lenawee and State of Michigan, have invented a certain new and useful Improvement in Railway Signaling Systems, of which the following is a full, clear, concise, and exact description, reference being had to the accompanying drawings, forming a part of this specification.

My invention relates to railway signal systems, and especially to systems for giving an alarm or signal at railway crossings on the approach of a train.

Prominent objects of the invention are, to provide a simple, practical and effective system of this kind.

The system which I show herein for carrying out my invention is shown as applied to an electric railway system, although the invention is also applicable to steam railway systems.

In the system shown herein, I combine the signaling or alarm system with the trolley system in such a way that the latter is instrumental in automatically giving a signal or alarm on the approach of a car to a crossing or other desired point. A simple way of carrying this out is to provide one or more auxiliary or signaling wires at the side of the trolley wire, and provide the usual trolley pole with a device or member adapted to engage said auxiliary wire or wires, and to connect the latter in circuit with a signaling device such as a bell, and if necessary, with suitable resistance devices to pass the proper amount of current through the signaling device. Thus the trolley in traveling along a trolley wire, will come in contact with the auxiliary wire before reaching the crossing, and by closing the circuit therethrough, will sound an alarm at any desired point.

In the accompanying drawings, Figure 1 is a plan of a portion of a railroad track and a trolley system, together with a signaling system embodying my present invention; Fig. 2 is a view showing a trolley car and trolley and signaling wires, together with the circuit connections of the signaling system embodying my invention; Fig. 3 is an elevation of a portion of the trolley pole and the trolley and auxiliary wires.

In Figs. 1 and 2 I have shown the rails or tracks 1, 1, crossing a roadway 2 at which the signaling device is to be operated. The trolley wire 3 is shown suspended by suitable posts 4, 4 carrying arms 5, 5 to which the trolley wire 3 and auxiliary or signal wires 6, 6 are insulatingly secured by insulating supports 7, 7. The auxiliary or signal wires 6, 6 are shown extended in opposite directions on opposite sides of the crossing and extend as far from the crossing as it is desired to have the signal given. Of course these wires could be placed at any desired location along the track. In Fig. 2 a trolley car 8 is shown mounted on the rails and provided with a trolley pole 9 having a trolley wheel 10 coming in contact with the trolley wire 3. The trolley pole 9 is provided with a side extension conveniently consisting of a prolongation 11 of the trolley wheel axle. This extension 11 is adapted to make contact with the auxiliary wires 6, 6, striking either one or the other thereof according as said extension is on one or the other side of the trolley wire 3. A wire or rod 12 is extended down from the extension 11 to a bracket 13 on the trolley pole 9. This is to prevent the pin or extension 11 from getting above the wires 6, 6 and striking the insulators or supports and injuring the same.

The two signal wires 6, 6 are connected together by a conductor 14 which is connected in circuit with suitable resistance shown in the form of electric lamps 15, the circuit also including a signaling device in the form of a bell 16. The latter is connected with the rail 1 by a conductor 17 so that the trolley wire 3 is connected by the trolley wheel and pin 11 in circuit with the resistance, bell and the rail, and power station, with the result that the circuit will be automatically closed by the trolley on coming in contact with one or the other of the signal wires 6, 6. When the car comes from one direction, one wire 6 will be contacted with, and when the car comes from the other direction, the other wire will be made contact with. By having two wires in this way, the signaling will be done on the approach of the car to the crossing coming from either direction, and will be discontinued in each case when the car reaches or passes the crossing.

The invention can be used to give a signal upon the approach of a car or train to a depot, or for other purposes. The general plan or principle of operation can be carried out by apparatus other than that herein set forth.

In the arrangement set forth, the lamps 15 also serve as signaling devices, by becoming lighted, which is especially desirable at night.

What I claim is:—

1. The combination with track rails and a trolley wire of signaling conductors extending on opposite sides of said trolley wire, a car traveling on said rails and having a trolley to engage the trolley wire, said trolley being provided with a side extension to engage the signaling conductors, and with a bracket extending laterally from the trolley pole a substantial distance from the upper extremity thereof, a guard member comprising a rod connected with the outer end of said side extension and with the outer end of the bracket and extending parallel to the trolley pole, and a circuit connected with the trolley wire and with the rails and including a signaling device.

2. The combination with track rails and a trolley wire of signaling conductors extending on opposite sides of said trolley wire, a car traveling on said rails and having a trolley to engage the trolley wire, said trolley being provided with a side extension to engage the signaling conductors, a guard member depending from the outer end of the side extension of the trolley, and a circuit connected with the trolley wire and with the rails and including a signaling device.

In witness whereof, I hereunto subscribe my name this 12th day of July A. D., 1906.

CARL J. SCHWARZE.

Witnesses:
ANNA NOONE,
EDMUND H. GRIFFIN.